(12) United States Patent
Miller et al.

(10) Patent No.: US 10,712,475 B2
(45) Date of Patent: Jul. 14, 2020

(54) MULTI-LAYER THIN FILM STACK FOR DIFFRACTIVE OPTICAL ELEMENTS

(71) Applicant: Lumentum Operations LLC, Milpitas, CA (US)

(72) Inventors: John Michael Miller, Ottawa (CA); Stephen Bagnald, Ottawa (CA)

(73) Assignee: Lumentum Operations LLC, Milpitas, CA (US)

( * ) Notice: Subject to any disclaimer, the term of this patent is extended or adjusted under 35 U.S.C. 154(b) by 43 days.

(21) Appl. No.: 15/837,990

(22) Filed: Dec. 11, 2017

(65) Prior Publication Data

US 2019/0056531 A1 Feb. 21, 2019

Related U.S. Application Data

(60) Provisional application No. 62/546,174, filed on Aug. 16, 2017.

(51) Int. Cl.
*G02B 1/11* (2015.01)
*G02B 1/115* (2015.01)
(Continued)

(52) U.S. Cl.
CPC .......... *G02B 1/115* (2013.01); *G02B 5/1866* (2013.01); *G02B 5/1871* (2013.01); *G02B 27/44* (2013.01); *G02B 27/4272* (2013.01)

(58) Field of Classification Search
CPC ........ G02B 1/115; G02B 1/12; G02B 5/1857; G02B 5/1866; G02B 5/1871; G02B 27/44; G02B 27/1093; G02B 27/4272
See application file for complete search history.

(56) References Cited

U.S. PATENT DOCUMENTS 4,895,790 A 1/1990 Swanson et al.
5,218,471 A 6/1993 Swanson et al.
(Continued)

FOREIGN PATENT DOCUMENTS

CN 103424995 A 12/2013
DE 10328873 A1 1/2004
(Continued)

OTHER PUBLICATIONS

Opton, "Diffractive optics for laser and LED applications", http://www.edphoton.com/English.htm, Sep. 15, 2010, 1 page.
(Continued)

*Primary Examiner* — Wen Huang
(74) *Attorney, Agent, or Firm* — Harrity & Harrity, LLP

(57) ABSTRACT

An optical element may include a substrate. The optical element may include a first anti-reflectance structure for a particular wavelength range formed on the substrate. The optical element may include at least one layer disposed on a portion of the first anti-reflectance structure. The optical element may include a second anti-reflectance structure for the particular wavelength range formed on the at least one layer. A depth between a first surface of the first anti-reflectance structure and a second surface of the second anti-reflectance structure, a first index of refraction of the first anti-reflectance structure, a second index of refraction of the second anti-reflectance structure, and a third index of refraction of the at least one layer may be selected to form a diffractive optical element associated with a particular phase delay for the particular wavelength.

23 Claims, 14 Drawing Sheets

(51) Int. Cl.
*G02B 5/18* (2006.01)
*G02B 27/44* (2006.01)
*G02B 27/42* (2006.01)

(56) References Cited

U.S. PATENT DOCUMENTS

| | | | |
|---|---|---|---|
| 5,774,239 | A | 6/1998 | Feldman et al. |
| 8,163,144 | B2 | 4/2012 | Tilsch et al. |
| 9,239,467 | B2 | 1/2016 | Shpunt et al. |
| 9,354,369 | B2 | 5/2016 | Handrix et al. |
| 10,094,961 | B2 | 10/2018 | Speckbacher et al. |
| 2003/0016447 | A1 | 1/2003 | Kato et al. |
| 2004/0020892 | A1 | 2/2004 | Matthews et al. |
| 2007/0103782 | A1 | 5/2007 | Lee et al. |
| 2008/0074748 | A1 | 3/2008 | Kittaka et al. |
| 2012/0037872 | A1 | 2/2012 | Ikarashi et al. |
| 2017/0235153 | A1 | 8/2017 | Lee-Bouhours et al. |
| 2019/0041243 | A1 | 2/2019 | Funk et al. |

FOREIGN PATENT DOCUMENTS

| | | |
|---|---|---|
| DE | 102005020944 A1 | 12/2005 |
| EP | 1309051 A1 | 5/2003 |
| EP | 3150970 A1 | 4/2017 |
| EP | 3438618 A1 | 2/2019 |
| WO | 2005038501 A1 | 4/2005 |

OTHER PUBLICATIONS azt.tm's Blog findings and projects. "Kinect Pattern Uncovered", https://azttm.wordpress.com/2011/04/03/kinect-pattern-uncovered/, Mar. 4, 2011, 8 pages.
Jahns et al. "Two-dimensional array of diffractive microlenses fabricated by thin film deposition", Mar. 1, 1990, 6 pages.
Turunen et al., "Diffractive Optics for Industrial and Commercial Applications", 1997, 3 pages.
H A Macleod, "Thin-Film Optical Filters", 2001, 667 pages.
European Search Report corresponding to EP 18188407.3 dated Jan. 2, 2019, 11 pages.
J. N. Mait, "Fourier Array Generators", 1997, 16 pages.
Vasara et al., "Binary surface-relief gratings for array illumination in digital optics", Jun. 10, 1992, 17 pages.
Krackhardt et al., "Design of Dammann-Gratings for Array Generation", Dec. 1, 1989, 6 pages.
Arbabi A., et al., "Subwavelength-Thick Lenses with High Numerical Apertures and Large Efficiency Based on High Contrast Transmitarray," Oct. 30, 10 pages.
Extended European Search Report for Application No. EP18188469.3, dated Jan. 2, 2019, 11 pages.
Optics & Photonics News, "Subwavelength Photonics," May 2017, 8 pages.
Wendt J.R., et al., "Nanofabrication of Subwavelength, Binary, High Efficiency Diffractive Optical Elements in GaAs," Aug. 1, 1995, 4 pages.

MULTI-LAYER THIN FILM STACK FOR DIFFRACTIVE OPTICAL ELEMENTS

RELATED APPLICATION(S)

This application claims priority under 35 U.S.C. § 119 to U.S. Provisional Patent Application No. 62/546,174, filed on Aug. 16, 2017, the content of which is incorporated by reference herein in its entirety.

TECHNICAL FIELD

The present disclosure relates to thin film stacks. More particularly, some aspects of the present disclosure relate to a multi-layer thin film stack for a diffractive optical element (DOE) that provides a particular phase delay between an etched region and an un-etched region of the multi-layer thin film stack, and that provides an anti-reflectance coating for a particular wavelength range.

BACKGROUND

A diffractive optical element (DOE) may be used for directing a beam. For example, a DOE, such as a diffractive lens, a spot array illuminator, a spot array generator, a Fourier array generator, and/or the like, may be used to split a beam, shape a beam, focus a beam, and/or the like. A DOE may be integrated into a multicast switch, a wavelength selective switch, a gesture recognition system, a motion sensing system, and/or the like.

A multi-level surface relief profile may be selected for a surface relief DOE. For example, a two-level (sometimes termed "binary") surface relief profile may be selected for the surface relief DOE. The multi-level surface relief profile may be selected to approximate a continuous surface relief profile and to enable use of a photolithographic procedure and/or an etching procedure to manufacture the DOE. A two-level thin film stack may be used to create a single order binary DOE, such as a diffractive lens. Some materials used for DOEs may require an etch depth of greater than a threshold, thereby resulting in a threshold etch time to manufacture the DOE.

SUMMARY

According to some possible implementations, an optical element may include a substrate. The optical element may include a first anti-reflectance structure for a particular wavelength range formed on the substrate. The optical element may include at least one layer disposed on a portion of the first anti-reflectance structure. The optical element may include a second anti-reflectance structure for the particular wavelength range formed on the at least one layer. A depth between a first surface of the first anti-reflectance structure and a second surface of the second anti-reflectance structure, a first index of refraction of the first anti-reflectance structure, a second index of refraction of the second anti-reflectance structure, and a third index of refraction of the at least one layer may be selected to form a diffractive optical element associated with a particular phase delay for the particular wavelength.

According to some possible implementations, a method may include depositing a plurality of layers onto a wafer. The depositing may form a first anti-reflectance structure for a particular wavelength beneath a second anti-reflectance structure for the particular wavelength. The method may include etching a subset of layers of the plurality of layers to form a two-level relief profile. The etching may form a diffractive optical element associated with a particular phase delay for the particular wavelength between the first anti-reflectance structure and the second anti-reflectance structure.

According to some possible implementations, a method may include depositing a plurality of thin films onto a wafer using a thin film deposition technique. The depositing the plurality of thin films may include depositing a first anti-reflectance structure for a particular wavelength, and depositing a second anti-reflectance structure for the particular wavelength after depositing the first anti-reflectance structure. The method may include patterning the mask based on a set of determined transition points that define a plurality of regions of the wafer. The method may include etching a subset of thin films of the plurality of thin films to form a two-level relief profile based on the mask. The etching may form a diffractive optical element associated with a $\pi$ phase delay for the particular wavelength between the first anti-reflectance structure and the second anti-reflectance structure. The method may include removing the mask.

DETAILED DESCRIPTION

The following detailed description of example implementations refers to the accompanying drawings. The same reference numbers in different drawings may identify the same or similar elements.

A diffractive optical element (DOE) may be manufactured using a photolithographic procedure and/or an etching procedure. For example, to approximate a continuous surface relief profile, a multi-level surface relief profile may be selected for the DOE, and a surface of the DOE may be etched or patterned to form the multi-level surface relief profile. The multi-level surface relief profile may be used to create a phase delay for a beam passing through the DOE. For a single order binary DOE, such as a diffractive lens, a diffractive efficiency of approximately 40% may be achieved using the binary-level surface relief profile. However, this diffractive efficiency may be less than a threshold that is necessary for utilization of a DOE in an optical system, such as an optical communication system, a gesture recognition system, a motion detection system, and/or the like. Moreover, it may be advantageous in some systems to reduce a 0-order for an optical system to avoid, for example, causing eye damage in a gesture recognition system.

Some implementations, described herein, may provide a two-level DOE with a threshold diffractive efficiency. For example, some implementations, described herein, may provide a two-level (also termed "binary") DOE with a threshold feature size (e.g., a threshold quantity of wavelengths) to provide a π phase delay between portions of the DOE. Moreover, the DOE may be associated with an etch depth to fabricate a selected surface relief profile of less than a threshold, thereby resulting in a reduced aspect ratio, a reduced etch time, and/or a reduced fabrication cost for the DOE (relative to other techniques for manufacturing a DOE). Furthermore, layers of the DOE may provide an anti-reflectance functionality for the DOE, may provide an integrated etch stop for the DOE, may include a material selected for a particular operating wavelength range for the DOE, and/or the like. Some implementations, described herein, may provide a method for configuring and/or manufacturing a DOE. Based on using thin film deposition techniques, a phase delay may be controlled with a greater degree of accuracy, which may reduce the 0-order for the optical system. For example, a thin film deposition technique may be associated with a tolerance of less than 1%, less than 0.5%, less than 0.2%, less than 0.1%, and/or the like. Other manufacture techniques with similarly controlled tolerances may also be used to construct a DOE, described herein.

Figure 1:
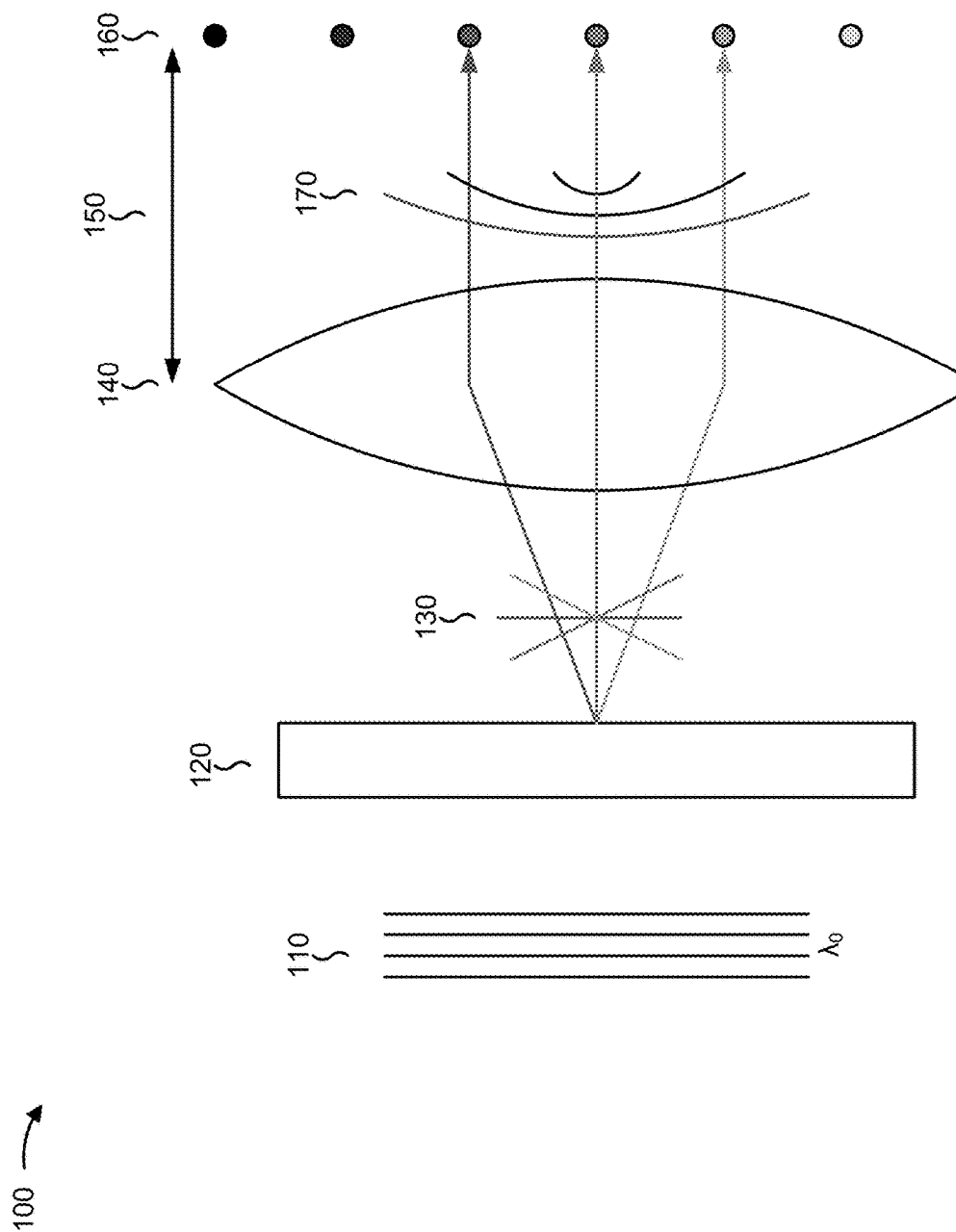
FIG. 1 is a diagram of an overview of an example implementation described herein.

FIG. 1 is a diagram of an overview of an example implementation 100 described herein. FIG. 1 shows an example of spot array generation using a surface relief DOE grating and a converging lens as a spot array illuminator (sometimes termed a spot array generator).

As shown in FIG. 1, an incident plane wave 110, with a wavelength of $\lambda_0$, is directed toward a surface relief DOE grating 120. In some implementations, surface relief DOE grating 120 may be a DOE with a multi-level surface relief profile, such as a two-level DOE (sometimes termed a binary DOE). In some implementations, surface relief DOE grating 120 may include, for example, alternating layers of silicon (Si) and silicon dioxide ($SiO_2$), alternating layers of hydrogenated silicon (Si:H) and silicon dioxide, and/or the like. In some implementations, layers of surface relief DOE grating 120 may be configured to provide an anti-reflectance functionality in etched regions of surface relief DOE grating 120 and in un-etched regions of surface relief DOE grating 120. In some implementations, a layer of surface relief DOE grating 120 (e.g., a silicon dioxide layer) may provide an etch stop functionality during manufacture of surface relief DOE grating 120. In some implementations, incident plane wave 110 may have a wavelength in a range from approximately 800 nanometers (nm) to approximately 100 nm, approximately 800 nm to approximately 1000 nm, approximately 830 nm to approximately 1000 nm, approximately 850 nm to approximately 1000 nm, approximately 915 nm to approximately 1000 nm, approximately 940 nm to approximately 1000 nm, and/or the like. Additional details regarding surface relief DOE grating 120 are described herein.

As further shown in FIG. 1, surface relief DOE grating 120 diffracts incident plane wave 110, and directs wavefront 130 (e.g., diffracted orders of incident plane wave 110) toward a converging lens 140. Converging lens 140 is separated by a focal distance 150 from a focal plane 160. In some implementations, example implementation 100 may be used for a gesture recognition system, and focal plane 160 may be a target for gesture recognition. Additionally, or alternatively, focal plane 160 may be an object (e.g., for a motion sensing system), a communications target (e.g., for an optical communications system), and/or the like.

As further shown in FIG. 1, based on converging lens 140 altering an orientation of wavefront 130 to form wavefront 170, wavefront 170 is directed toward focal plane 160 causing a multiple spot array pattern to be formed at focal plane 160. In some implementations, surface relief DOE grating 120 may be used to create a one-dimensional spot array. In some implementations, surface relief DOE grating 120 may be used to create a two-dimensional spot array. In this way, surface relief DOE grating may be used as a spot array illuminator to create a spot array at focal plane 160 from incident plane wave 110, thereby enabling a gesture recognition system, a motion sensing system, an optical communications system, and/or the like.

As indicated above, FIG. 1 is provided merely as an example. Other examples are possible and may differ from what was described with regard to FIG. 1.

Figure 2A:
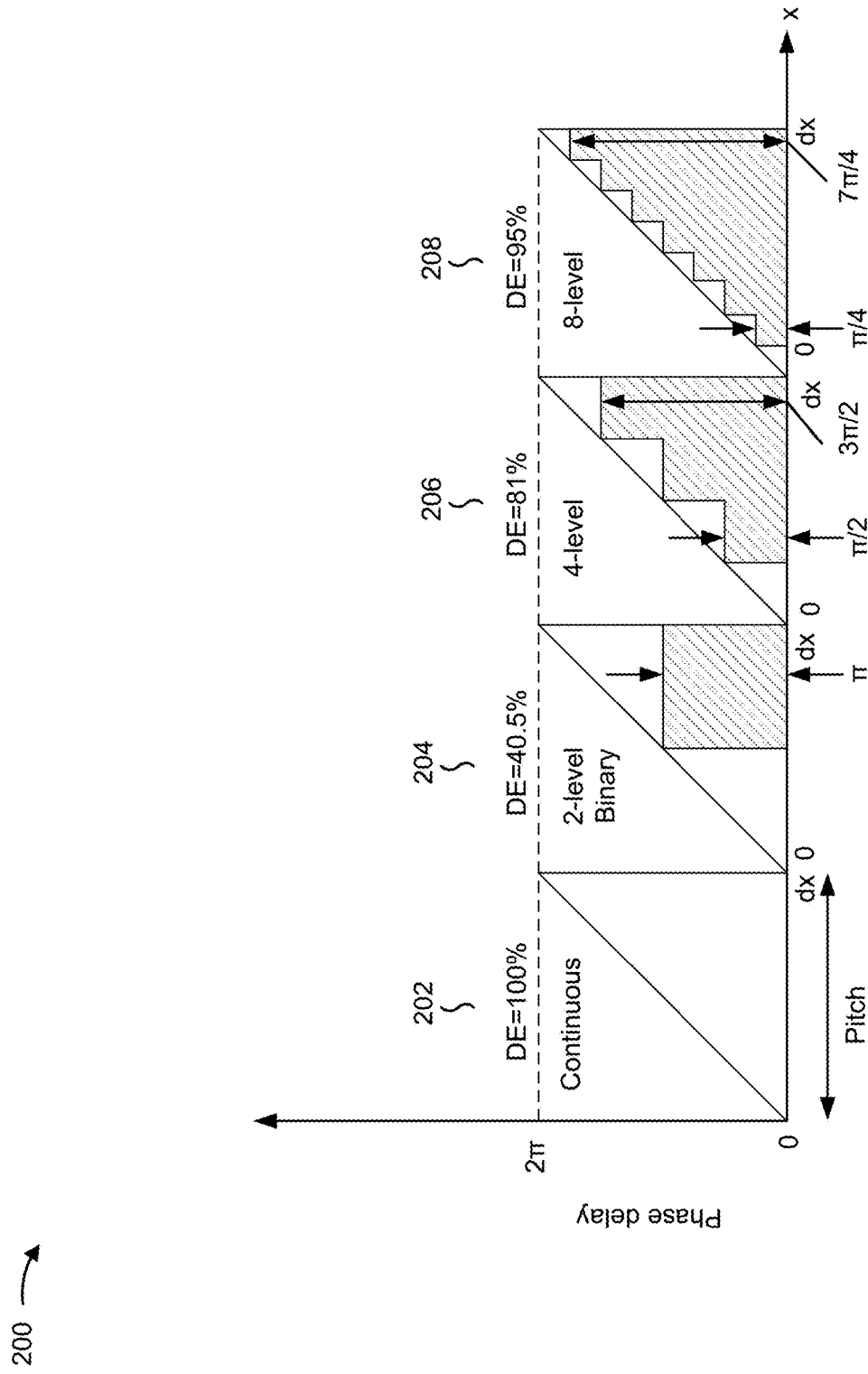
FIGS. 2A and 2B are diagrams of characteristics relating to an example implementation described herein.
Figure 2B:
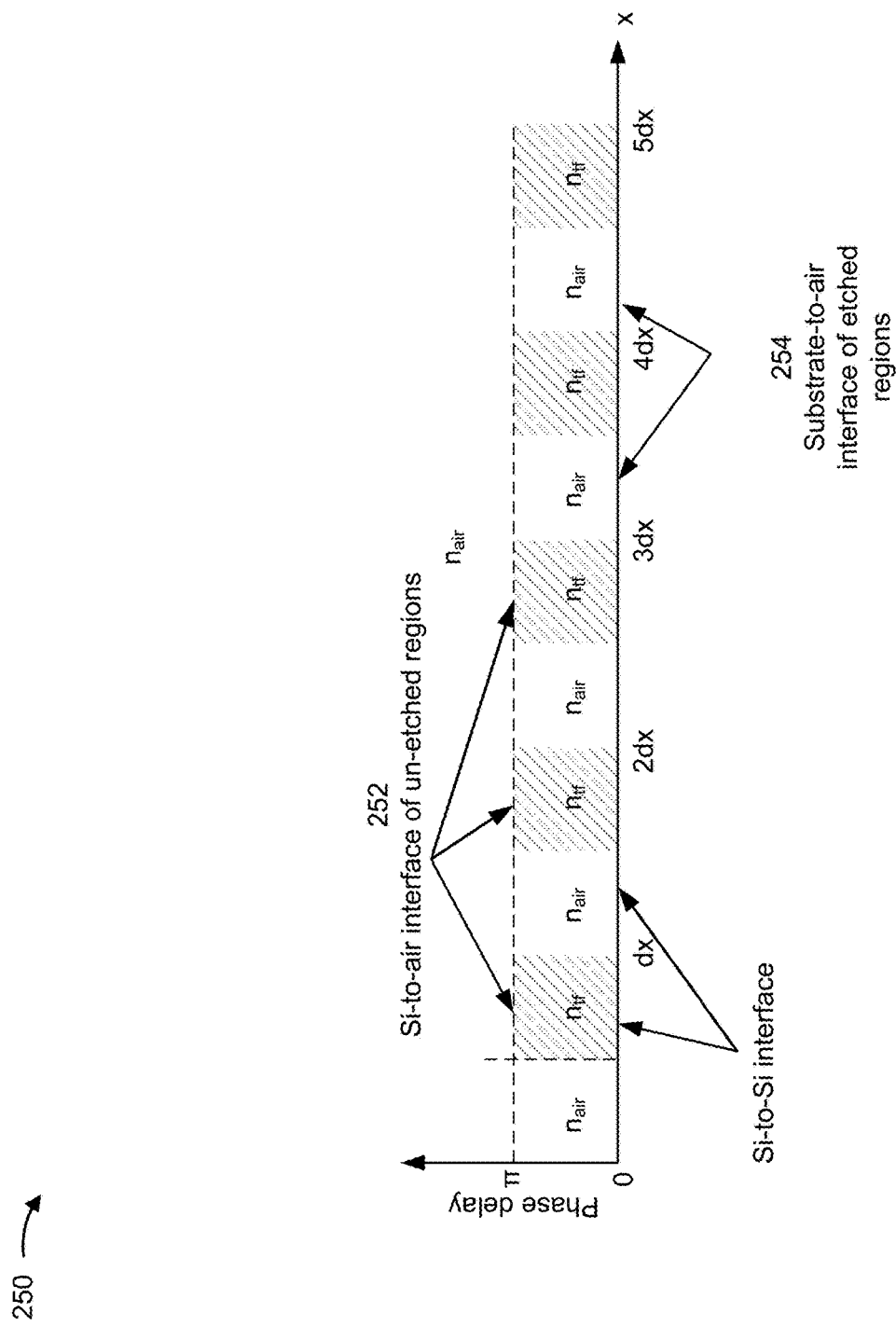

FIGS. 2A and 2B are diagrams 200 and 250, respectively, associated with characteristics relating to a DOE. As shown in FIG. 2A, and by diagram 200, a continuous relief profile can be quantized into a series of discrete levels to enable a photolithographic and/or an etching procedure to be used for manufacturing a DOE.

As further shown in FIG. 2A, and by reference number 202, a continuous relief profile may be associated with a diffractive efficiency of approximately 100% (for a single order configuration) and may provide a continuously increasing phase delay of a from a second pitch position, dx, relative to a first pitch position, 0. As shown by reference number 204, the continuous relief profile may be approximated by a two-level relief profile (sometimes termed a binary relief profile). The two-level binary relief profile may be associated with a diffractive efficiency of approximately 40.5% (for a single order configuration) and may provide a π phase delay at a second region of a DOE, from pitch position 0.5dx to pitch position dx, relative to a first region of the DOE, from pitch position 0 to pitch position 0.5dx.

As further shown in FIG. 2A, and by reference number 206, the continuous relief profile may be approximated by a 4-level relief profile. The 4-level relief profile may be associated with a diffractive efficiency of approximately 81% (for a single order configuration), and may provide a π/2 phase delay at a second region of the DOE, from pitch position 0.25dx to pitch position 0.5dx, relative to a first region of the DOE, from 0 to 0.25dx; a π phase delay at a third region of the DOE, from 0.5dx to 0.75dx relative to the first region of the DOE; and a 3π/2 phase delay at a fourth region of the DOE, from 0.75dx to dx, relative to the first region of the DOE.

As further shown in FIG. 2A, and by reference number 208, the continuous relief profile may be approximated by an 8-level relief profile. The 8-level relief profile may be associated with a diffractive efficiency of approximately 95% (for a single order configuration), and may provide phase delays in increments of π/4 at regions of the DOE (e.g., π/4 at a second region from 0.125dx to 0.25dx; π/2 at a third region, from 0.25dx to 0.375dx; 3π/4 at a fourth region, from 0.375dx to 0.5dx; etc. relative to a first region of the DOE, from 0 to 0.125dx). In some implementations, another configuration with another diffraction efficiency may be used. For example, a configuration using 2 orders, 4 orders, 10 orders, 100 orders, thousands of orders, and/or the like may be used to increase a diffraction efficiency relative to the single order configuration. In this case, such as for +/−100 orders, a diffraction efficiency of approximately 65% to 80% may be achieved for a two-level relief profile.

As shown in FIG. 2B, and by diagram 250, the two-level relief profile may be used for a DOE with multiple un-etched regions 252 and etched regions 254. In some implementations, un-etched regions 252 may be associated with a π phase delay relative to etched regions 254. In some implementations, un-etched regions 252 may be associated with a thin film refractive index, $n_{tf}$, for a silicon (Si) to air interface. In some implementations, etched regions 254 may be associated with no phase delay. In other words, un-etched regions 252 are associated with a π phase delay relative to etched regions 254. In some implementations, etched regions 254 are associated with a refractive index, $n_{air}$, for a substrate (e.g., silicon) to air interface. In some implementations, each group of an etched region 254 and an un-etched region 252 may be, collectively, associated with a width, dx, and the DOE may be associated with a total width of N*dx where N is an integer value (e.g., 1, 2, 3, 4, 5, or the like) representing a quantity of groups of etched regions 254 and un-etched regions 252.

As indicated above, FIGS. 2A and 2B are provided merely as an example. Other examples are possible and may differ from what was described with regard to FIGS. 2A and 2B.

Figure 3A:
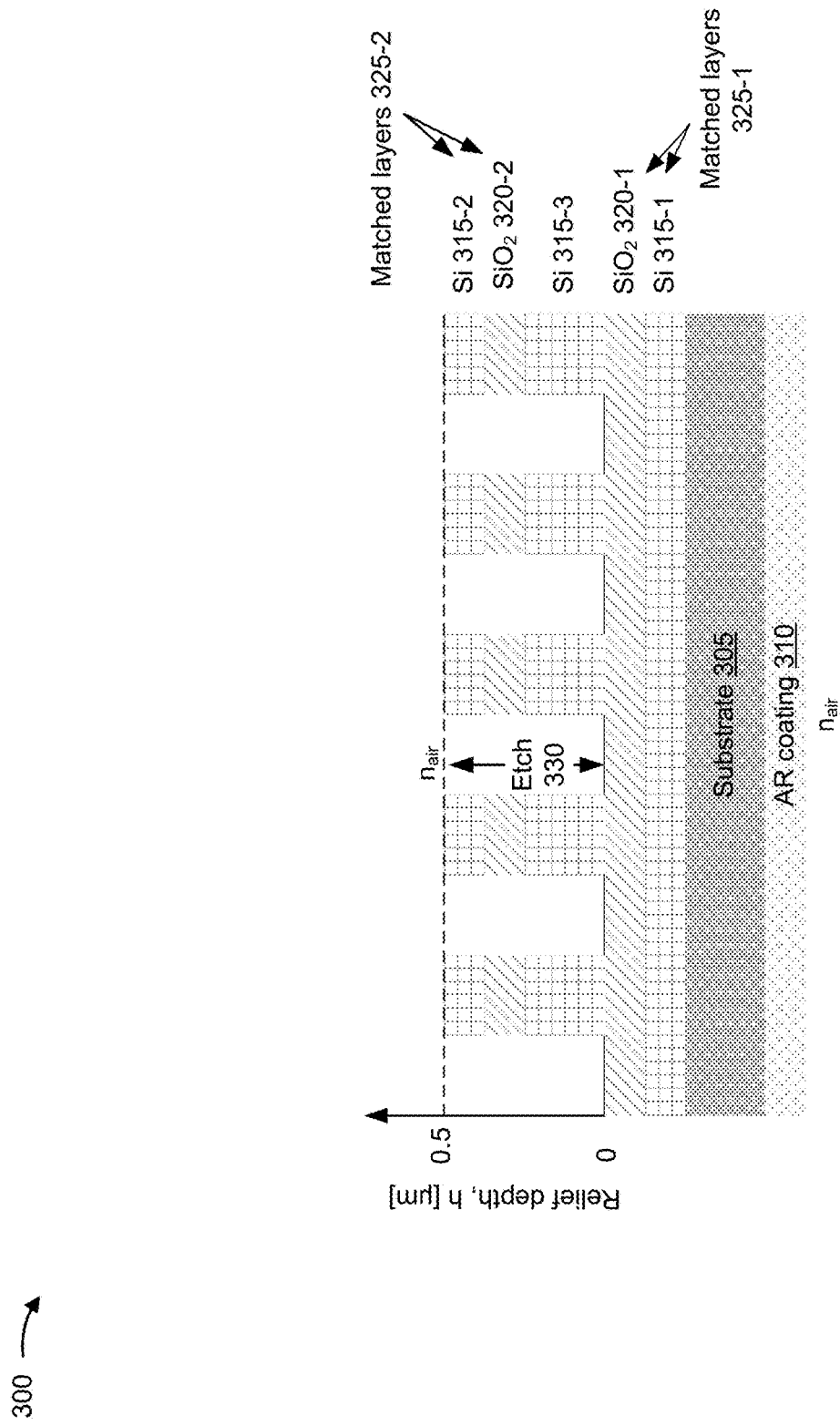
FIGS. 3A and 3B are diagrams of characteristics relating to an example implementation described herein.
Figure 3B:
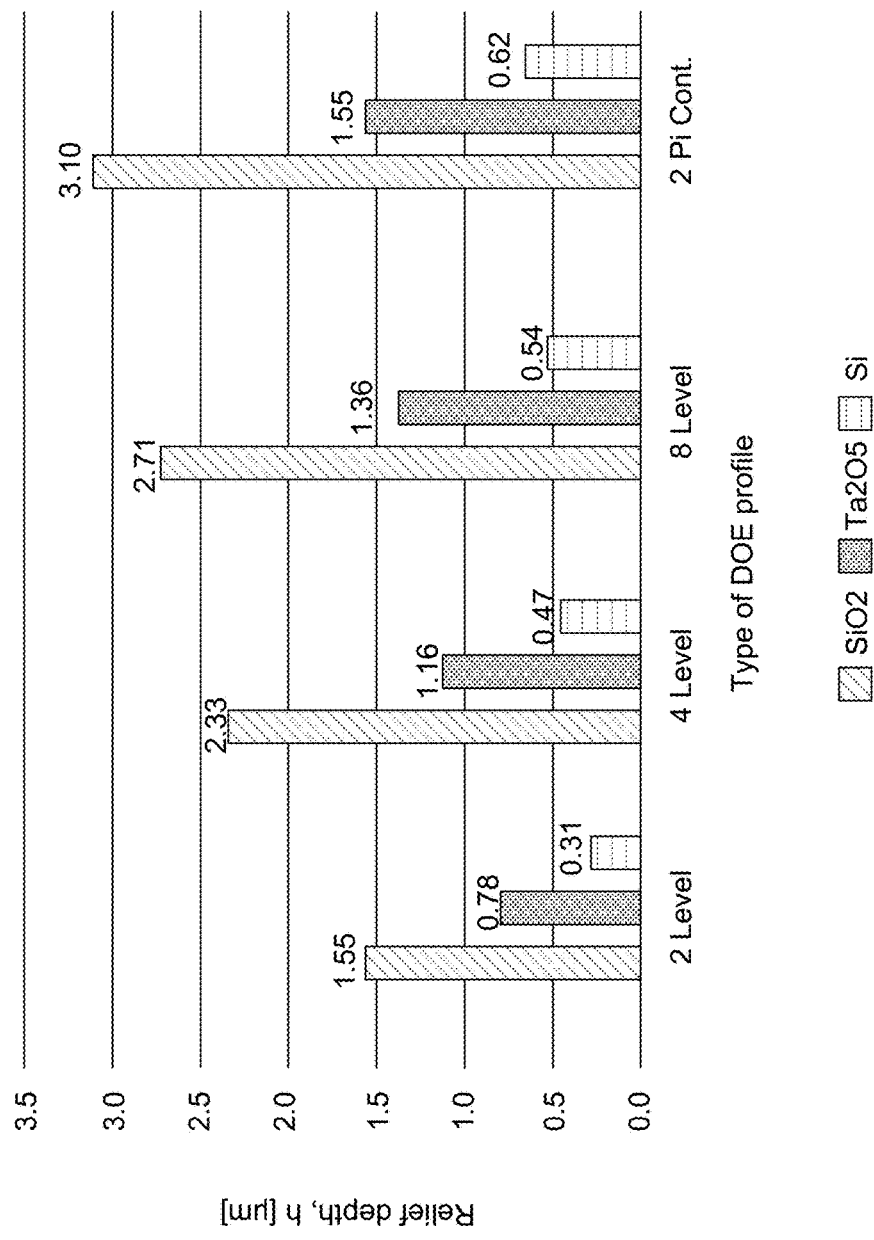

FIGS. 3A and 3B are diagrams associated with characteristics relating to a DOE. FIG. 3A, showing a DOE 300, corresponds to the two-level relief profile of the DOE in FIG. 2B, that may be configured to provide the π phase delay.

As shown in FIG. 3A, DOE 300 may include a substrate 305. In some implementations, substrate 305 may be a glass substrate, a fused silica substrate, and/or the like. For example, substrate 305 may be a fused silica substrate with a thickness of approximately 200 millimeters, and with a refractive index, $n_{sub}$, of 1.45. In some implementations, an anti-reflectance coating 310 may be disposed on a surface of substrate 305. For example, as shown in FIG. 3A, a set of alternating silicon and silicon dioxide layers may be disposed onto a top surface of substrate 305 and patterned to form a relief profile, as described herein, and anti-reflectance coating 310 may cover the bottom surface of substrate 305.

As further shown in FIG. 3A, a set of silicon layers 315 and a set of silicon dioxide layers 320 may be disposed onto the top surface of substrate 305. For example, silicon layer 315-1 may be disposed on substrate 305, and silicon dioxide layer 320-1 may be disposed on silicon layer 315-1. Silicon layer 315-1 and silicon dioxide layer 320-1 may form a pair of matched layers 325-1. Similarly, silicon layer 315-2 may be disposed on silicon dioxide layer 320-2, and may form a pair of matched layers 325-2. As shown, silicon layer 315-3 may be disposed between matched layers 325-1 and matched layers 325-2.

In some implementations, matched layers 325-1 and matched layers 325-2 may form an anti-reflectance coating to increase transmissivity of DOE 300. In some implementations, DOE 300 may be exposed to an air interface. For example, a first surface of DOE 300 (e.g., a surface of matched layers 325-1 and a surface of matched layers 325-2) and a second surface of DOE 300 (e.g., a surface of anti-reflectance coating 310) may be exposed to an air interface with a refractive index, $n_{air}$, of 1.0. A relief depth, h, may be calculated based on the equation:

$$h = \frac{\lambda_0}{2(n_{tf} - n_{air})}$$

where $\lambda_0$ is a nominal illuminating wavelength for a DOE, such as DOE 300. To reduce a relief depth, a material with a relatively large refractive index may be selected, such as silicon, which may result, in some implementations, in a relief depth, h, of an etch (e.g., etch 330) of approximately 0.5 micrometers (μm). In some implementations, the relief depth may be between approximately λ/4 and λ/2, where λ represents the particular wavelength at which a particular phase delay is achieved, such as a wavelength of approximately 940 nm, a wavelength of between 840 nm and 940 nm, and/or the like at which, for example, a π phase delay is achieved for an effective refractive index of between 2.0 and 3.0, an effective refractive index of 2.2, and/or the like. In some implementations, layers may be index matched to increase transmittance of DOE 300. For example, silicon layers 315 and silicon dioxide layers 320 may be selected based on respective refractive indices of 3.5 and 1.45 being within a threshold amount of between 3.1 to 3.9 and between 1.4 to 1.5, respectively. In this way, based on reducing a relief depth relative to other DOEs, some implementations, described herein, enable improved manufacturing tolerances.

As shown in FIG. 3B, and by diagram 350, other materials may be selected for a thin film coating material, such as tantalum pentoxide ($Ta_2O_5$) and silicon nitride ($Si_3N_4$), which may have a refractive index of approximately 2.0. As further shown by diagram 350, based on using silicon thin film for layers of DOE 300, a relief depth for each of a two-level, 4-level, 8-level, or continuous relief profile is reduced relative to other material selections. For example, for a π phase delay in a two-level relief profile at a nominal illuminating wavelength of 1550 nm, silicon dioxide may be associated with a relief depth of approximately 1.55 μm, tantalum pentoxide and silicon nitride may be associated with a relief depth of approximately 0.78 μm, and silicon may be associated with a relief depth of approximately 0.31 μm.

As indicated above, FIGS. 3A and 3B are provided merely as an example. Other examples are possible and may differ from what was described with regard to FIGS. 3A and 3B.

Figure 4A:
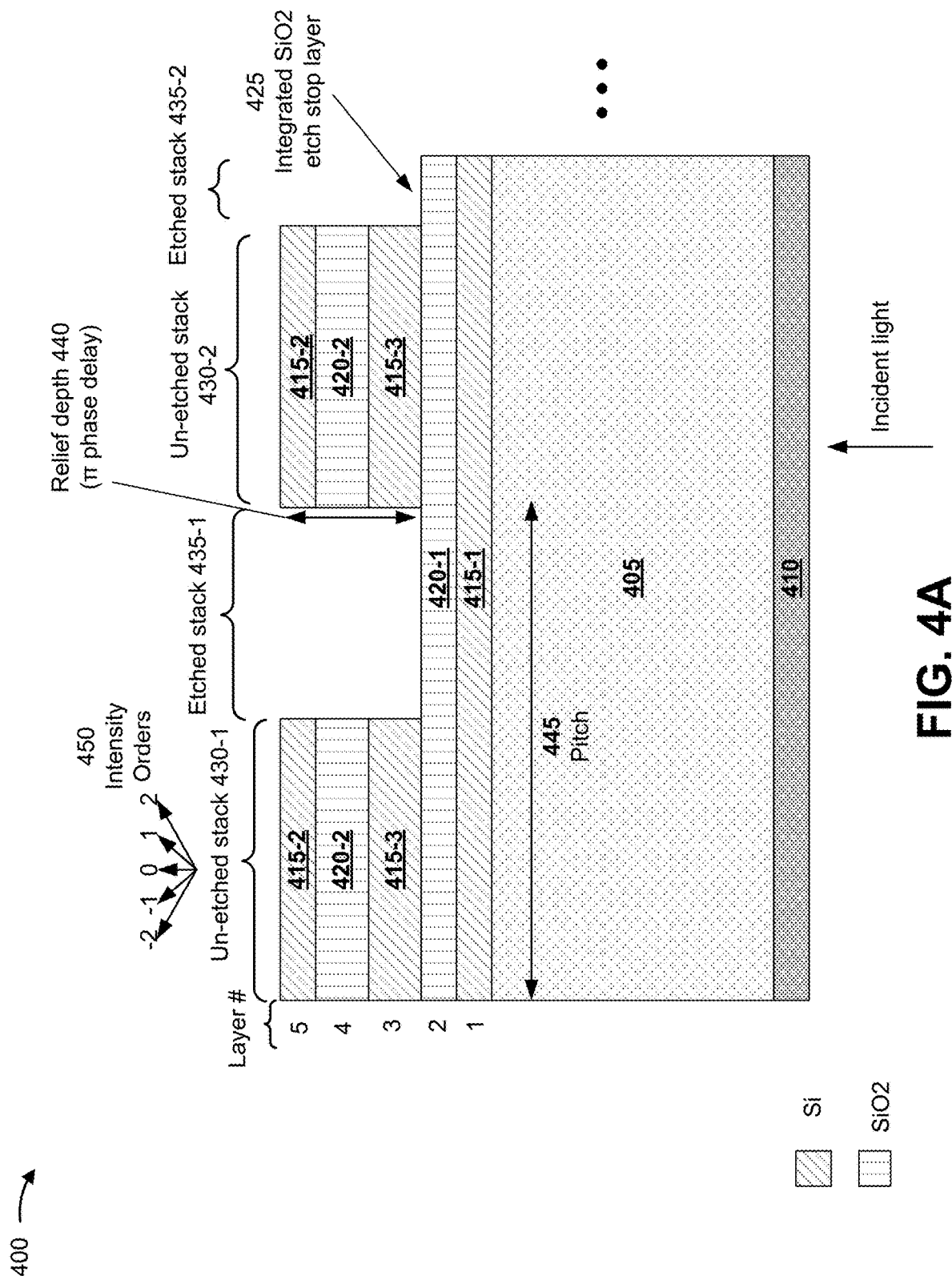
FIGS. 4A-4C are diagrams of an example implementation described herein.
Figure 4B:
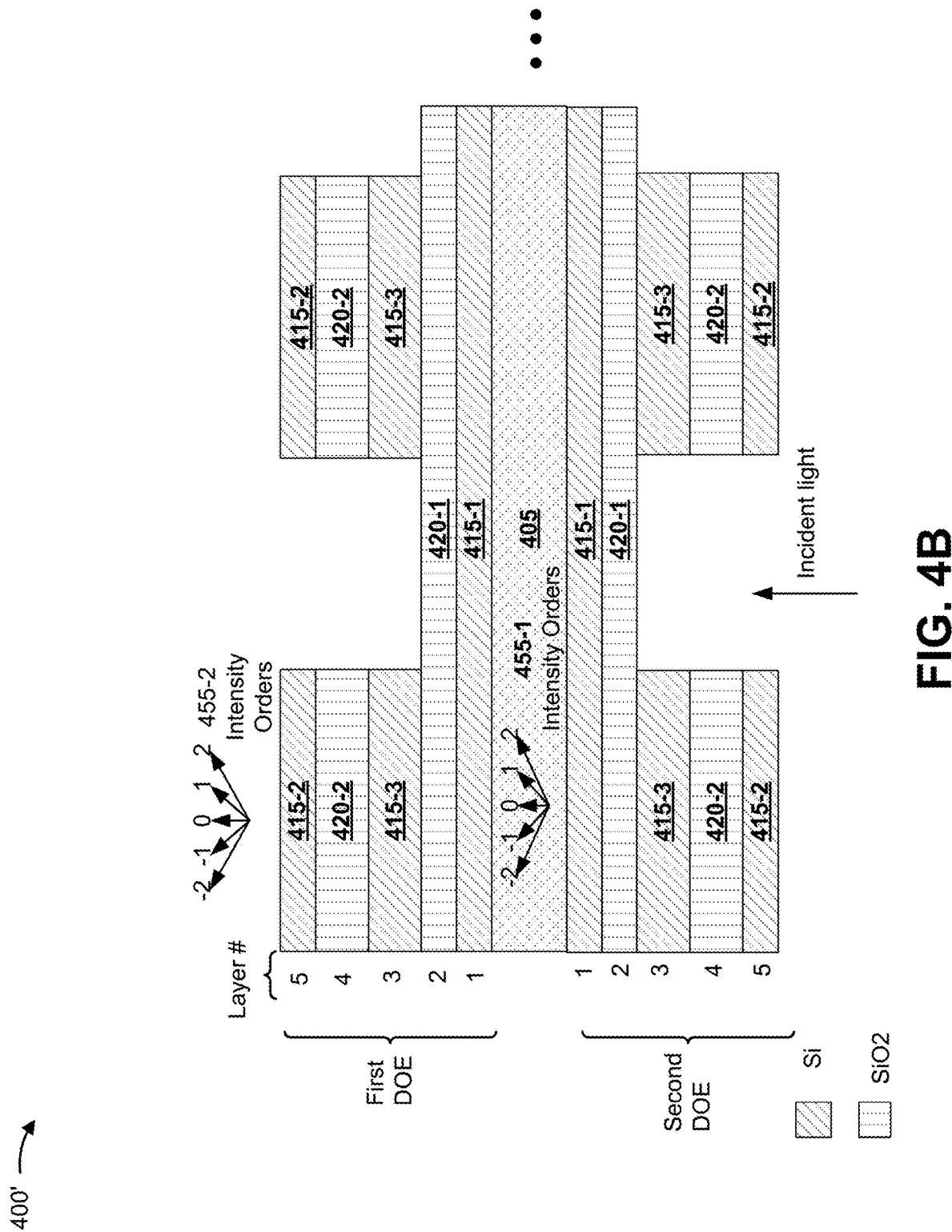
Figure 4C:
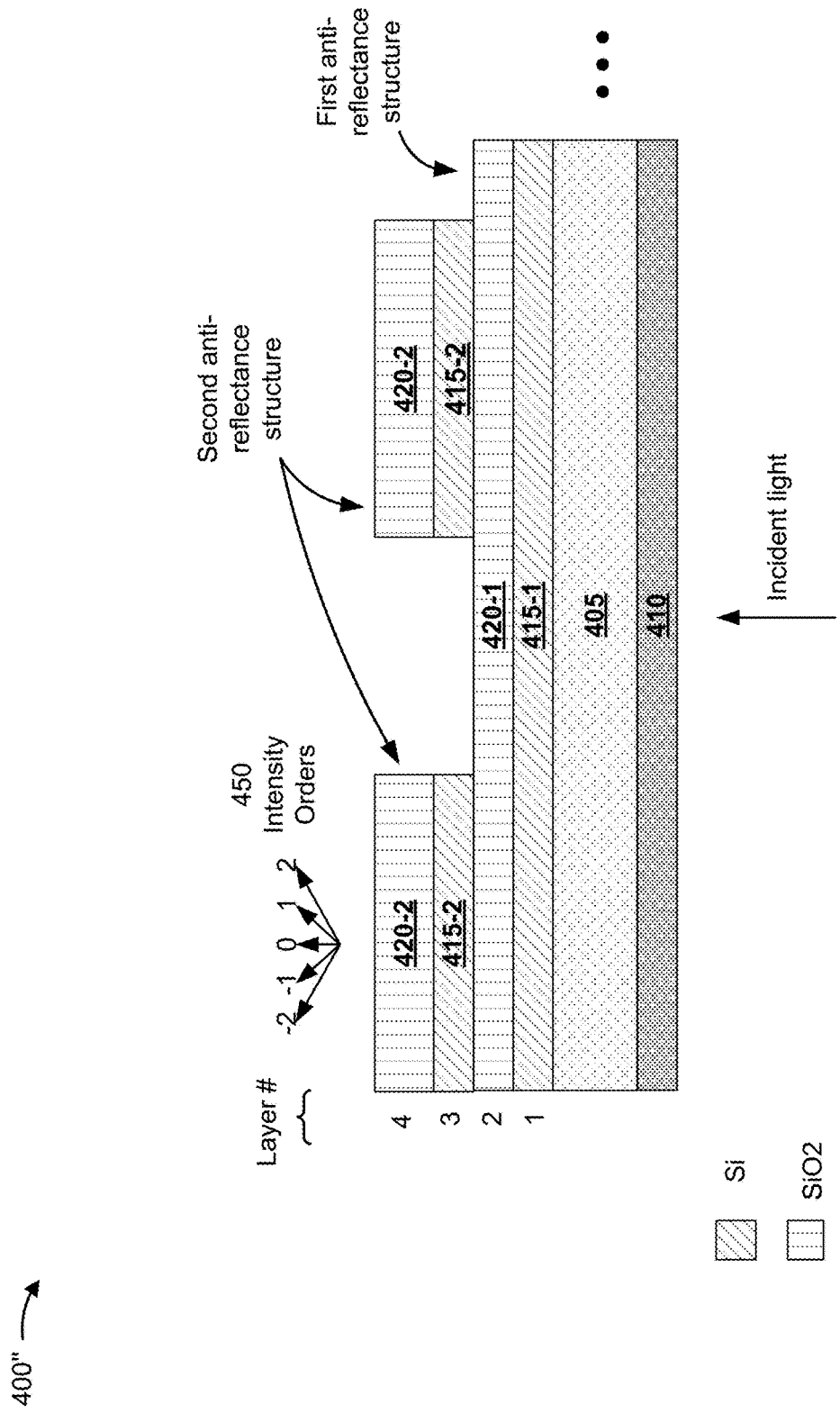

FIGS. 4A-4C are diagrams of example implementations of DOEs 400/400'/400". As shown in FIG. 4A, DOE 400 includes substrate 405, an anti-reflectance coating 410, a set of silicon layers 415-1 through 415-3, and a set of silicon dioxide layers 420-1 through 420-2.

As further shown in FIG. 4A, and by reference number 425, silicon dioxide layer 420-1 may be an etch stop layer to enable etching to form a π phase delay. For example, an etching procedure may be performed such that un-etched stacks 430-1 and 430-2 remain un-etched and etched stacks 435-1 and 435-2 are etched to a threshold relief depth 440 to provide a π phase delay between etched stacks 435-1 and 435-2 and un-etched stacks 430-1 and 430-2. In some implementations, multiple etching procedures using multiple tools may be performed to etch DOE 400. For example, DOE 400 may be manufactured using a first silicon etch with a silicon dioxide layer as an etch stop, a first silicon dioxide etch with a silicon layer as an etch stop, and a second silicon etch with another silicon dioxide layer as an etch stop (e.g., using a deep reactive ion (DRIE) etch tool), and/or the like.

In some implementations, layers of DOE 400 may form a set of anti-reflectance structures. For example, layers 420-1 and 415-1 may form a first anti-reflectance structure for a particular wavelength range and layers 415-2 and 420-2 may form a second anti-reflectance structure for the particular wavelength range, thereby forming a two-level relief profile. Additionally, or alternatively, layer 415-2 may form the second anti-reflectance structure. The second anti-reflectance structure may be formed on the first anti-reflectance structure (e.g., in un-etched stacks 430), and the first anti-reflectance structure (e.g., layer 420-1) may be an etch stop for etching to form the second anti-reflectance structure. In some implementations, at least one layer, such as layer 415-3, both layer 415-3 and 420-2, and/or the like, may be between the first anti-reflectance structure and the second anti-reflectance structure. In this way, an alteration to the etch region may be performed to alter a characteristic of DOE 400 without altering transmission of DOE 400. In some implementations, the first anti-reflectance structure and the second anti-reflectance structure may not be separated by a layer. In some implementations, layer 415-3 may provide another functionality for DOE 400, such as another functionality in addition to a particular phase delay (e.g., a $\pi$ phase delay) and an anti-reflectance functionality. In some implementations, collectively, the anti-reflectance structures of DOE 400 form a DOE.

In some implementations, each layer may be associated with a particular thickness. For example, layer 1 (e.g., silicon layer 415-1) may be associated with a thickness of approximately 209 nanometers (nm); layer 2 (e.g., silicon dioxide layer 420-1) may be associated with a thickness of 162 nm; layer 3 (e.g., silicon layer 415-3), where present, may be associated with a thickness of 238 nm; layer 4 (e.g., silicon dioxide layer 420-2), where present, may be associated with a thickness of 254 nm; and layer 5 (e.g., silicon layer 415-2), where present, may be associated with a thickness of 20 nm. In some implementations, DOE 400 may be associated with a particular pitch 445 (sometimes termed a period), dx. For example, pitch 445 may be approximately 1 micron to 1000 microns. In some implementations, a capping layer may be formed onto the fifth layer (e.g., another silicon dioxide layer), which may improve robustness during dicing of a wafer that includes substrate 405.

In some implementations, thicknesses of layers of DOE 400, a size of pitch 445, an index of refraction of the anti-reflectance structures and/or the layers thereof, and/or the like may be selected to cause the particular phase delay (e.g., the $\pi$ phase delay) at a particular wavelength for which the anti-reflectance structures provide an anti-reflectance functionality. For example, the first anti-reflectance structure may be associated with a first (effective) index of refraction of 1.5, the second anti-reflectance structure may be associated with a second (effective) index of refraction of 3.5, and the set of layers between the first anti-reflectance structure and the second anti-reflectance structure (e.g., layer 415-3) may be associated with a third (effective) index of refraction of 3.5. Additionally, or alternatively, the particular wavelength may include a wavelength range of between approximately 1540 nm and 1560 nm. As shown by reference number 450, based on incident light being directed at a first side of substrate 405, a set of intensity orders (e.g., intensity orders −2, −1, 0, 1, 2, etc.) are provided by DOE 400.

As shown in FIG. 4B, DOE 400' includes a first diffractive optical element formed on a first side of substrate 405 and a second diffractive optical element formed on a second side of substrate 405. Each diffractive optical element includes a set of silicon layers 415-1 through 415-3 and a set of silicon dioxide layers 420-1 through 420-2. As shown by reference numbers 455-1 and 455-2, based on incident light being directed toward DOE 400', the second diffractive optical element causes a first set of intensity orders to be directed through substrate 405 to the first diffractive optical element, which causes a second set of intensity orders to be provided from DOE 400'. In this way, substrate 405 maintains an alignment of the first diffractive optical element and the second diffractive optical element, thereby reducing a difficulty in maintaining alignment relative to another technique, such as free space optics or using a pick-and-place machine.

As shown in FIG. 4C, DOE 400" includes a first anti-reflectance structure formed on a surface of substrate 405 and a second anti-reflectance structure formed on a surface of a portion of the first anti-reflectance structure (e.g., without one or more layers being formed between the first anti-reflectance structure and the second anti-reflectance structure). For example, the first anti-reflectance structure and the second anti-reflectance structure may provide an anti-reflectance functionality for a particular wavelength, such as a wavelength range of between 930 nm and 950 nm, and may provide a particular phase delay, such as a $\pi$ phase delay, at the particular wavelength. In some implementations, layers of DOE 400" may be associated with a particular thickness. For example, layer 1 may be associated with a thickness of approximately 121 nm, layer 2 may be associated with a thickness of approximately 107 nm, layer 3 may be associated with a thickness of approximately 130 nm, layer 4 may be associated with a thickness of approximately 258 nm, and/or the like.

Although some implementations, described herein, are described in terms of a particular quantity of layers, such as 4 layers or 5 layers, other quantities of layers are possible, such as 6 layers (e.g., 6 alternating silicon/silicon dioxide layers), 7 layers, 10 layers, 20 layers, and/or the like.

As indicated above, FIGS. 4A-4C are provided merely as examples. Other examples are possible and may differ from what was described with regard to FIGS. 4A-4C.

Figure 5:
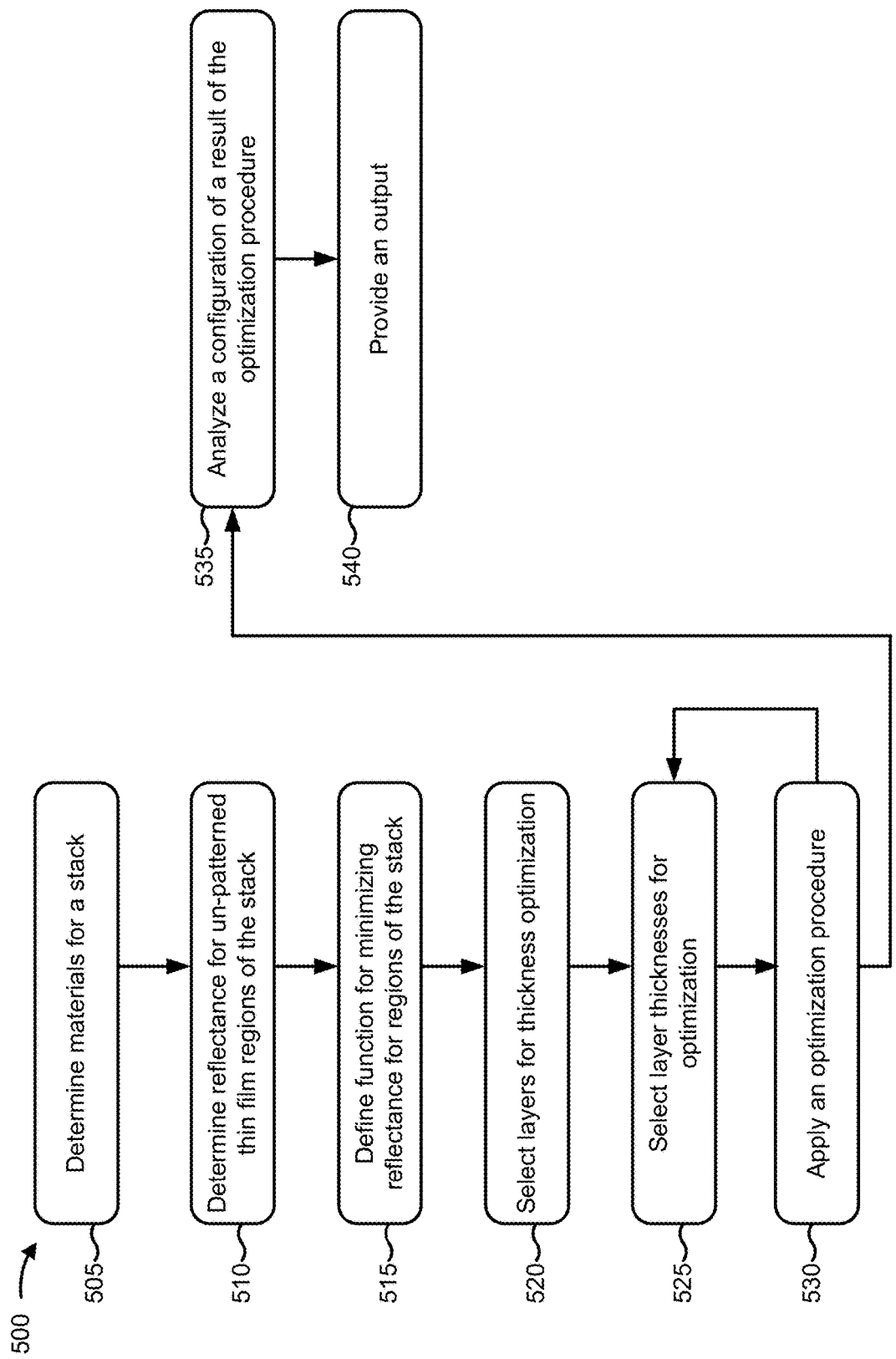
FIG. 5 is a flow chart of an example process for configuring an example implementation described herein.
Figure 6A:
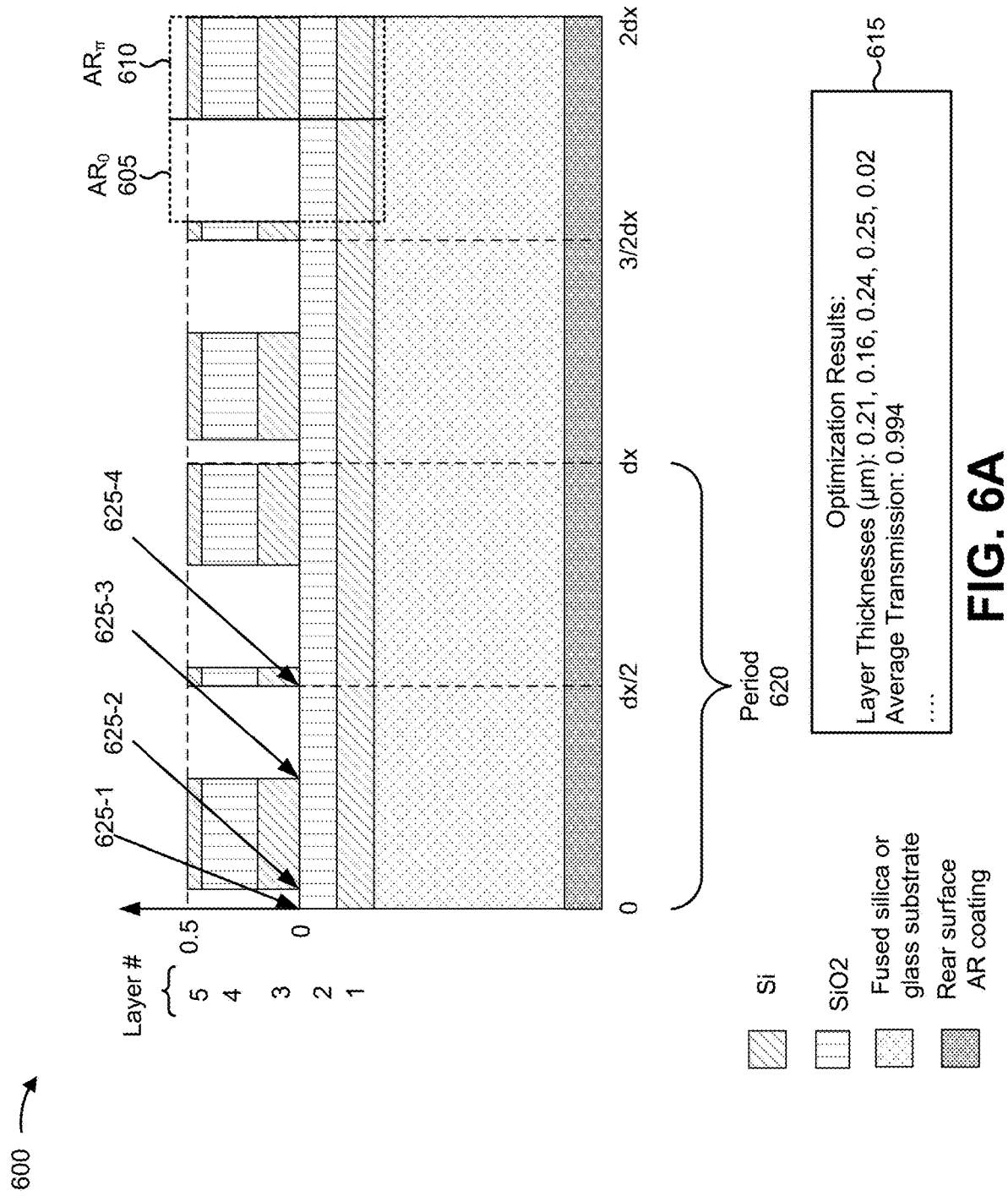
FIGS. 6A and 6B are diagrams of an example implementation relating to the example process shown in FIG. 5.
Figure 6B:
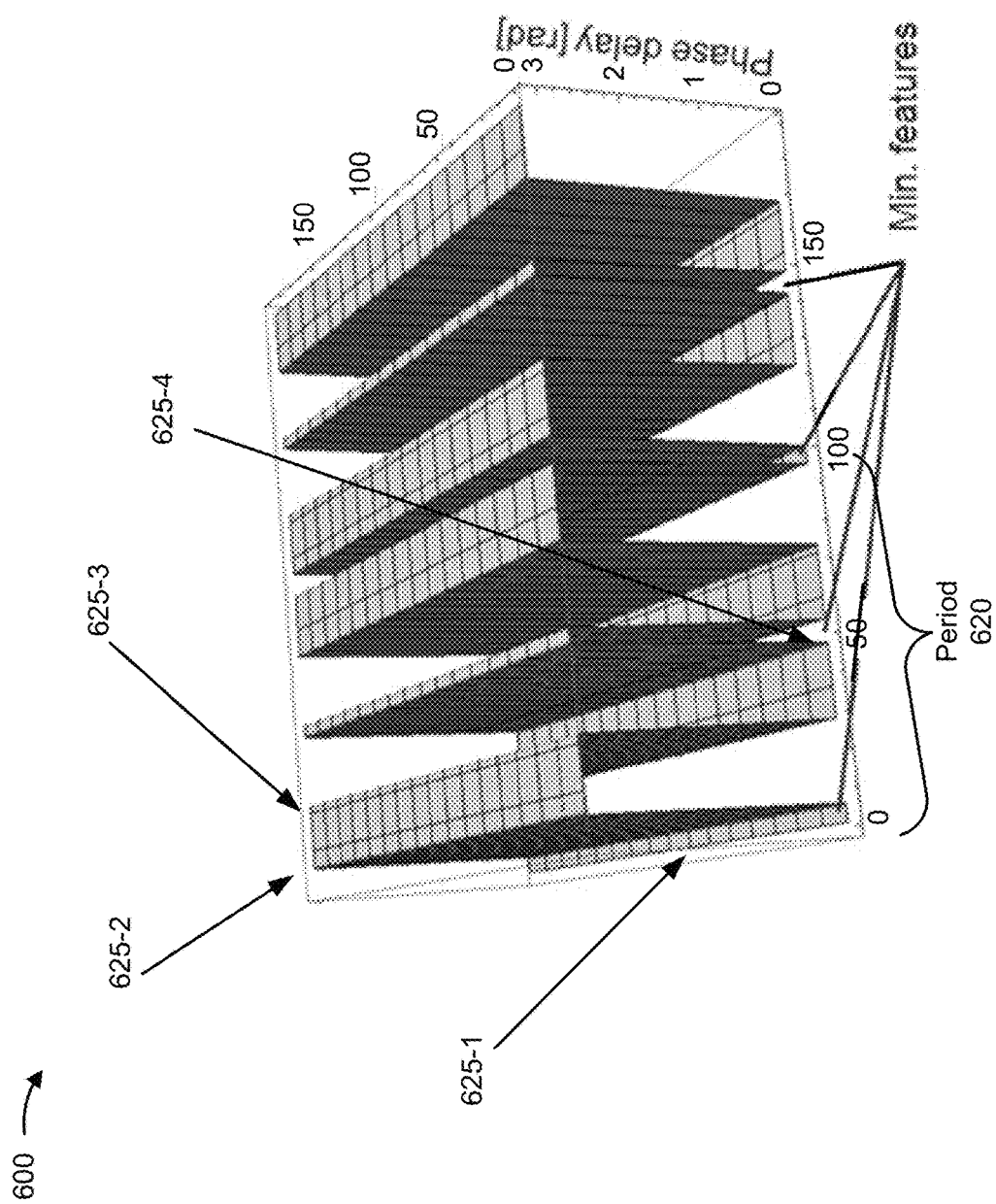

FIG. 5 is a flow chart of an example process 500 for configuring a DOE. In some implementations, one or more process blocks of FIG. 5 may be performed by a client device. In some implementations, one or more process blocks of FIG. 5 may be performed by another device or a group of devices separate from or including a client device, such as a server device. FIGS. 6A and 6B are diagrams of an example implementation 600 relating to example process 500 shown in FIG. 5.

As shown in FIG. 5, process 500 may include determining materials for a stack (block 505). For example, a client device may determine the materials for the stack. In some implementations, a client device may receive input identifying the materials for the stack. For example, during design of the DOE, a designer may select a set of coating materials based on a set of design criteria. In some implementations, the set of coating materials may include silicon, hydrogenated silicon, silicon dioxide, tantalum pentoxide, silicon nitride, a combination thereof, and/or the like. In some implementations, the set of design criteria may include a wavelength range for the DOE, a refractive index for a material, a transmissivity of a material, and/or the like. In some implementations, the stack may be a multi-layer stack. For example, as shown in FIG. 6A, the stack may be a 5 layer stack of alternating silicon and silicon dioxide thin films disposed onto a fused silica substrate, a glass substrate, and/or the like.

As further shown in FIG. 5, process 500 may include determining reflectance for un-patterned thin film regions of the stack (block 510). For example, a client device may determine the reflectance for un-patterned thin film regions of the stack. In some implementations, a client device may receive input identifying reflectance for a first region and a second region. For example, a designer may determine reflectance for a first region of the stack including a substrate and a first pair of alternating silicon and silicon dioxide thin film layers, as shown by reference number 605 in FIG. 6A.

This first region may be termed $AR_0$. In this case, the designer may determine reflectance for a second region of the stack including the substrate, the first pair of alternating silicon and silicon dioxide thin film layers, a silicon thin film layer, and a second pair of alternating silicon and silicon dioxide thin film layers, as shown by reference number 610 in FIG. 6A. This second region may be termed $AR_\pi$. Based on $AR_0$ and $AR_\pi$ as separate un-patterned stacks, reflectance, transmittance, and phase delay can be determined for $AR_0$ and $AR_\pi$, using thin film theory, thereby enabling global optimization to be employed with improved efficiency relative to optimization of calculations made using diffraction theory. In this way, utilization computing resources by a client device for optimization of a configuration for a DOE may be reduced relative to other techniques.

As further shown in FIG. 5, process 500 may include defining a function for minimizing reflectance for regions of the stack (block 515). For example, a client device may define the function for minimizing reflectance for regions of the stack. In some implementations, the function may be a merit function, a cost function, and/or the like. For example, a client device may receive input identifying a function, such that optimization (e.g., minimization) of the function results in reflectance being reduced for regions of the stack with a phase delay of $\pi$ being maintained between $AR_0$ and $AR_\pi$. In this way, a client device may improve transmittance to a threshold level for a particular wavelength range, such as a transmittance of at least approximately 80%, approximately 90%, approximately 95%, approximately 99%, and/or the like.

As further shown in FIG. 5, process 500 may include selecting layers for thickness optimization (block 520). For example, a client device may select at least one layer for thickness optimization. In some implementations, a client device may receive input identifying the at least one layer. For example, a designer may select to optimize a thickness of layer 3 shown in FIG. 6A (e.g., a silicon layer sandwiched between matched layers 1 and 2 and matched layers 4 and 5), and may specify thicknesses for layers 1, 2, 4, 5 to enable optimization of reflectance for the DOE with regard to a thickness for layer 3. In some implementations, the thickness for a layer may be determined based on a set of equations:

$$\Delta\phi = k \sum_{i=1}^{N} h_i(n_i - 1)$$

$$k = \frac{2\pi}{\lambda_0}$$

where $\Delta\phi$ represent a selected phase delay (e.g., $\pi$), k represents a constant value (e.g., of layer 3), $h_i$ represents a relief depth of a layer i, $n_i$ represents a refractive index of a layer i, and $\lambda_0$ represents a nominal illuminating wavelength of the DOE. In this way, a client device may calculate a thickness of, for example, layer 3 to obtain the selected phase delay based on the thicknesses of the other layers of the DOE.

As further shown in FIG. 5, process 500 may include selecting layer thicknesses for optimization (block 525). For example, a client device may select layer thicknesses for optimization. In some implementations, a client device may randomly select thicknesses. For example, a client device may utilize a random selection procedure to select layer thicknesses for layers 1, 2, 4, and 5 to enable determination of a layer thickness of layer 3. In some implementations, a client device may utilize a non-random selection procedure, such as an optimization procedure to select thicknesses.

As further shown in FIG. 5, process 500 may include applying an optimization procedure (block 530). For example, a client device may apply the optimization procedure. In some implementations, a client device may use simulated annealing to optimize the reflectance of the DOE. For example, a client device may perform a simulated annealing procedure and a steepest descent algorithm procedure to optimize a cost function for configuring layer thicknesses to optimize (e.g., minimize) reflectance. In some implementations, a client device may perform the optimization procedure until a threshold criterion is satisfied (e.g., a threshold level of transmission is calculated, such as greater than 50% transmission, greater than 80% transmission, greater than 90% transmission, greater than 95% transmission, greater than 99% transmission, greater than 99.5% transmission, and/or the like).

As further shown in FIG. 5, process 500 may include analyzing a configuration of a result of the optimization procedure (block 535). For example, a client device may determine transition points for the DOE to determine a surface relief profile. As shown in FIG. 6A, and by reference number 615, a result of the optimization may identify optimized characteristics for a DOE. In some implementations, a client device may analyze a configuration with even orders and zero orders suppressed (which may be termed an even orders missing (EOM) configuration). For example, as shown with regard to FIGS. 6A and 6B, a client device may determine a diffraction theory analysis to determine a relief profile for a DOE for a 1×4 spot array generator. In this case, the DOE includes a relief profile for period 620, with a set of transition points 625. For example, transition point 625-1 may be located at 0dx, 625-2 at 0.054dx, 625-3 at 0.277dx, and 625-4 at 0.5dx, where dx represents a width of a period 620. In some implementations, a client device may receive information identifying the transition points based on a configuration for a spot array illuminator that is to include the DOE. In some implementations, a client device may automatically determine the transition points based on the configuration for the spot array illuminator. As further shown with regard to FIGS. 6A and 6B, each transition point corresponds to a transition between relief depth minimum and a relief depth maximum, and to a transition between a phase delay minimum (0) and a phase delay maximum (it).

In some implementations, a client device may perform an electromagnetic diffraction theory analysis. For example, a client device may determine a diffraction efficiency of transverse-electric (TE) polarization portion of a beam and a transverse-magnetic (TM) polarization portion of a beam. Based on the diffraction efficiency for the TE polarization and for the TM polarization satisfying a first threshold (i.e., being greater than the first threshold or within a threshold, such as within 10%, within 5%, within 2%, and/or the like, of a continuous relief profile diffraction efficiency), and based on a zero order diffraction efficiency satisfying a second threshold (i.e., being less than the second threshold, such as less than 10%, less than 5%, less than 2%, and/or the like), a client device may determine that the configuration for the DOE satisfies a set of design criteria.

As further shown in FIG. 5, process 500 may include providing an output (block 540). For example, a client device may provide output identifying a configuration (e.g., a relief profile) for a DOE to enable manufacture of the DOE. In some implementations, a client device may store the output identifying the configuration, provide the output identifying the configuration to a server device to trigger manufacture of the DOE, and/or the like.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. As indicated above, FIGS. 6A and 6B are provided merely as an example. Other examples are possible and may differ from what was described with regard to FIGS. 6A and 6B.

Figure 7:
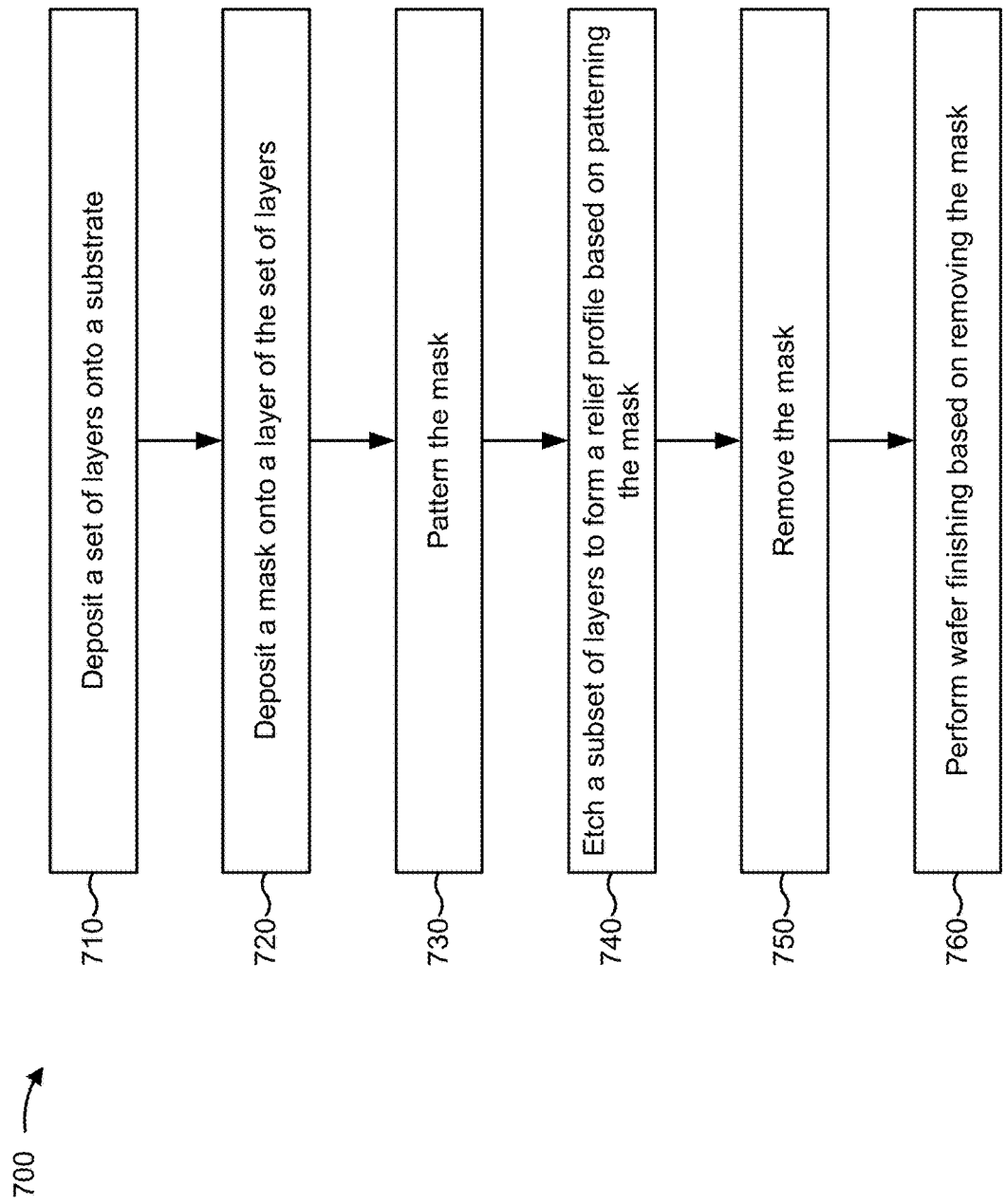
FIG. 7 is a flow chart of an example process for manufacturing an example implementation described herein.
Figure 8A:
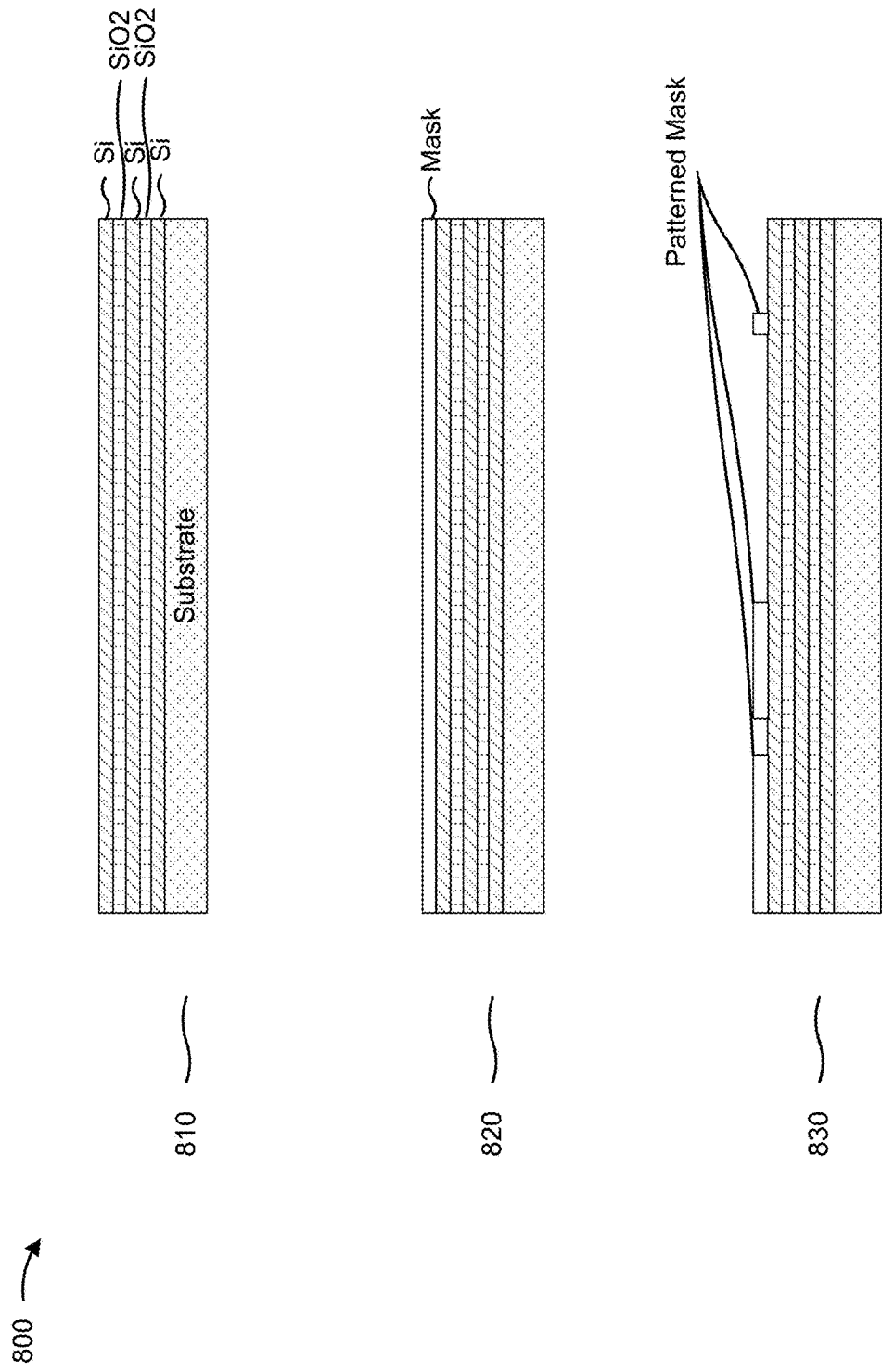
FIGS. 8A and 8B are diagrams of an example implementation relating to the example process shown in FIG. 7.
Figure 8B:
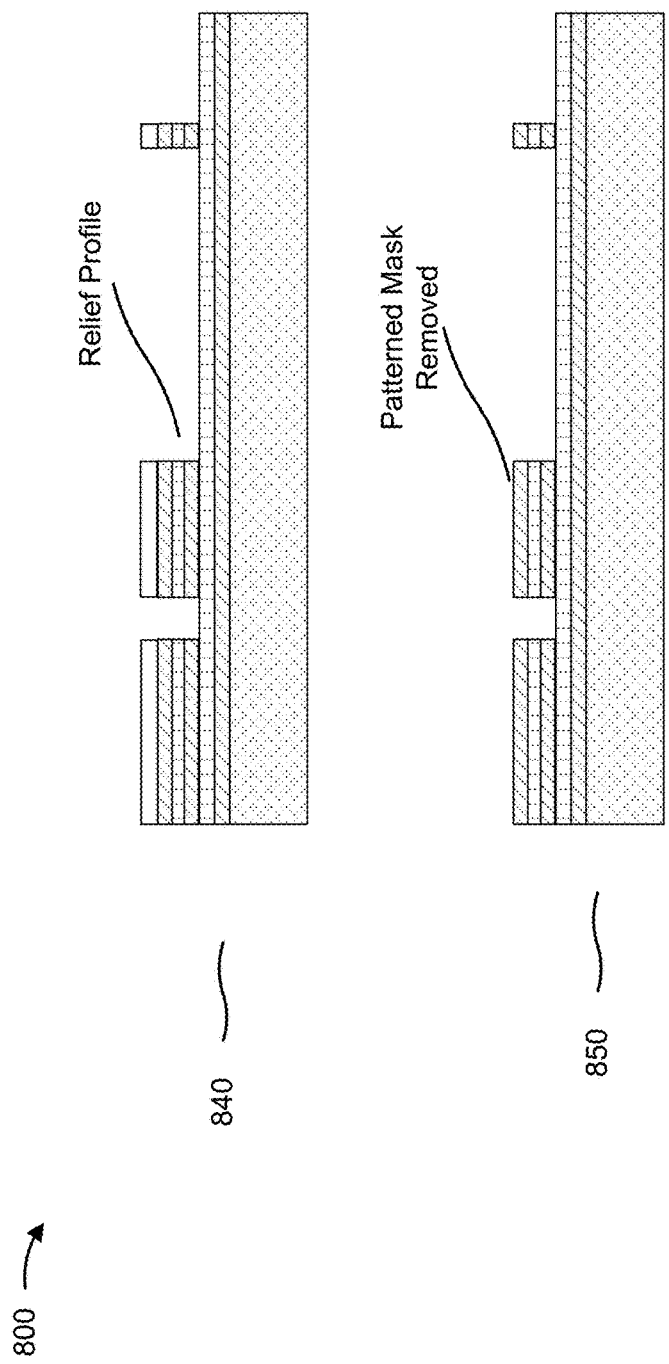

FIG. 7 is a flow chart of an example process 700 for manufacturing a DOE. FIGS. 8A and 8B are diagrams of an example implementation 800 relating to example process 700 shown in FIG. 7.

As shown in FIG. 7, process 700 may include depositing a set of layers onto a substrate (block 710). For example, as shown with regard to FIG. 8A, and by reference number 810, a plurality of thin films, such as a set of silicon layers and silicon dioxide layers may be deposited onto a substrate, such as a glass substrate or a fused silica substrate, to deposit a first anti-reflectance structure for a particular wavelength and a second anti-reflectance structure for a particular wavelength. In some implementations, the set of layers may include a first pair of silicon and silicon dioxide layers, a silicon layer, and a second pair of silicon and silicon dioxide layers deposited onto the substrate. In some implementations, an anti-reflectance coating may be deposited onto another surface of the substrate, such that the substrate is disposed between the anti-reflectance coating and the alternating silicon and silicon dioxide layers. In some implementations, anti-reflectance structures may be deposited onto a first side of the substrate and a second side of the substrate. In some implementations, another set of materials may be used for at least one of the layers, such as a tantalum pentoxide based material, a silicon nitride based material, and/or the like.

As further shown in FIG. 7, process 700 may include depositing a mask onto a layer of the set of layers (block 720). For example, as shown with regard to FIG. 8A, and by reference number 820, a mask layer may be deposited onto a silicon layer of the second pair of silicon and silicon dioxide layers, such that the mask layer covers the silicon layer. In some implementations, a material for the mask may be selected such that the mask is associated with a threshold selectively or a threshold resistivity to silicon etching and silicon dioxide etching.

As further shown in FIG. 7, process 700 may include patterning the mask (block 730). For example, as shown with regard to FIG. 8A, and by reference number 830, the mask layer may be patterned based on a configuration for the DOE. In this case, the mask layer may be patterned such that the mask covers portions of the DOE that are to correspond to, with regard to FIG. 4, un-etched stack 430, and is removed such that portions of the DOE that are to correspond to, with regard to FIG. 4, etched stack 435. In this case, the pattern for the mask may be determined based on configuring the DOE, as described herein with regard to FIG. 5. For example, the mask is patterned based on the determined transition points for the DOE.

As further shown in FIG. 7, process 700 may include etching a subset of layers to form a relief profile based on patterning the mask (block 740). For example, as shown with regard to FIG. 8B, and by reference number 840, a portion of the set of layers not covered by the patterned mask may be removed using silicon etching, silicon dioxide etching, and/or the like. In this case, a relief profile is formed in a subset of the set of layers. In some implementations, the etching is performed to remove less than the entire set of layers. For example, with regard to FIG. 4, the etching is performed to remove portions of layers 3-5. In this case, silicon dioxide (e.g., of layer 2) may perform an etch stop functionality for the DOE.

As further shown in FIG. 7, process 700 may include removing the mask (block 750). For example, as shown with regard to FIG. 8B, and by reference number 850, the mask may be removed. In this case, the set of layers remains on the substrate patterned to provide a $\pi$ phase delay between portions of the DOE for which the subset of layers were removed and portions of the DOE for which the subset of layers were not removed.

As further shown in FIG. 7, process 700 may include performing wafer finishing based on removing the mask (block 760). For example, the DOE may be tested, the DOE may be diced into multiple discrete DOEs (e.g., a wafer onto which multiple DOEs were patterned may be diced into the multiple discrete DOEs), and the DOE may be packaged for inclusion in an optical device. In some implementations, the wafer may be a 200 millimeter (mm)×0.725 mm wafer.

In this way, a quantity of steps for fabrication is reduced by providing a wafer that is coated with anti-reflectance thin film layers relative to another technique that includes etching a silica wafer to create a surface relief profile, coating the surface relief profile with an anti-reflectance coating, and/or the like. Moreover, based on reducing the quantity of steps, a cost, a supply chain difficulty, and/or the like may be reduced relative to other techniques.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel. As indicated above, FIGS. 8A and 8B are provided merely as an example. Other examples are possible and may differ from what was described with regard to FIGS. 8A and 8B.

In this way, a DOE with a thin film stack including alternating silicon layers (e.g., hydrogenated silicon layers) and silicon dioxide layers etched into a two-level relief profile is design and/or manufactured. Moreover, layers of the DOE may be designed to provide anti-reflectance properties, integrated etch stop properties, and/or the like. Furthermore, design may be performed using thin film process deposition, which may control zero order power. In some implementations, the DOE may be designed using non-diffraction theory based calculation techniques, thereby reducing processing resources to determine the design for the DOE. Furthermore, based on using a thin film deposition technique and an etching technique, a quantity of manufacture steps to manufacture the DOE may be reduced, thereby reducing time and cost relative to other techniques for manufacturing a DOE.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical element, comprising:
   a substrate;
   a first anti-reflectance structure for a particular wavelength range formed on the substrate;
   at least one layer disposed on a fractional portion of the first anti-reflectance structure; and
   a second anti-reflectance structure for the particular wavelength range formed on the at least one layer,
      wherein a depth between a first surface of the first anti-reflectance structure and a second surface of the second anti-reflectance structure, a first index of refraction of the first anti-reflectance structure, a second index of refraction of the second anti-reflectance structure, and a third index of refraction of the at least one layer are selected to form a diffractive optical element associated with a particular phase delay for a particular wavelength included in the particular wavelength range,
      wherein the second index of refraction is different from the third index of refraction, and
      wherein the first anti-reflectance structure includes two or more layers with a corresponding index of refraction that is different from each other.

2. The optical element of claim 1, wherein the first anti-reflectance structure is formed onto a first side of the substrate; and
   further comprising:
      an anti-reflectance coating formed on a second side of the substrate.

3. The optical element of claim 1, wherein the first anti-reflectance structure is an etch stop for etching the second anti-reflectance structure.

4. The optical element of claim 1, wherein at least one of the first anti-reflectance structure, the second anti-reflectance structure, or the at least one layer is formed using thin film deposition.

5. The optical element of claim 1, wherein the first anti-reflectance structure includes a first silicon layer and a first silicon dioxide layer;
   wherein the at least one layer includes a second silicon layer;
   wherein the second anti-reflectance structure includes a second silicon dioxide layer; and
   wherein the particular wavelength range is between approximately 840 nanometers and 860 nanometers.

6. The optical element of claim 1, wherein the first anti-reflectance structure, the second anti-reflectance structure, and the at least one layer are formed from alternating layers of silicon and silicon dioxide.

7. The optical element of claim 1, wherein the first anti-reflectance structure, the second anti-reflectance structure, and the at least one layer are formed from alternating layers of hydrogenated silicon and silicon dioxide.

8. The optical element of claim 1, wherein the first anti-reflectance structure is formed from a first layer of a first material and a second layer of a second material;
   wherein the at least one layer is formed from a third layer of the first material; and
   wherein the second anti-reflectance structure is formed from the first layer, the second layer, the third layer, a fourth layer of the second material, and a fifth layer of the first material.

9. The optical element of claim 1, wherein the first anti-reflectance structure is formed on a first side of the substrate; and
   further comprising:
      a third anti-reflectance structure for another particular wavelength range formed on a second side of the substrate;
      another at least one layer disposed on a fractional portion of the third anti-reflectance structure; and
      a fourth anti-reflectance structure for the other particular wavelength range formed on the other at least one layer.

10. The optical element of claim 1, wherein the first anti-reflectance structure and the second anti-reflectance structure form a two-level relief profile.

11. The optical element of claim 1, wherein the first anti-reflectance structure includes a first silicon layer and a first silicon dioxide layer;
    wherein the at least one layer includes a second silicon layer;
    wherein the second anti-reflectance structure includes a second silicon dioxide layer; and
    wherein the particular wavelength range is between approximately 930 nanometers and 950 nanometers.

12. The optical element of claim 1, wherein the first anti-reflectance structure includes a first silicon layer and a first silicon dioxide layer;
    wherein the at least one layer includes a second silicon layer and a second silicon dioxide layer;
    wherein the second anti-reflectance structure includes a third silicon layer; and
    wherein the particular wavelength is between approximately 1540 nanometers and 1560 nanometers.

13. The optical element of claim 1, wherein the particular wavelength is between approximately 840 nanometers and 940 nanometers.

14. The optical element of claim 1, wherein the depth is between $\lambda/4$ and $\lambda/2$,
wherein $\lambda$ represents the particular wavelength.

15. The optical element of claim 1, wherein an effective refractive index of the optical element is between 2.0 and 3.0.

16. The optical element of claim 1, wherein the particular phase delay is a $\pi$ phase delay.

17. The optical element of claim 1, wherein the particular phase delay is a non-$\pi$ phase delay.

18. A method, comprising:
depositing a plurality of layers onto a wafer,
wherein the depositing forms a first anti-reflectance structure for a particular wavelength beneath at least one layer formed on a fractional portion of the first anti-reflectance structure and a second anti-reflectance structure for the particular wavelength,
wherein an index of refraction of the second anti-reflectance structure is different from an index of refraction of the at least one layer, and
wherein the first anti-reflectance structure includes two or more layers with a corresponding index of refraction that is different from each other; and
etching a subset of layers of the plurality of layers to form a two-level relief profile,
wherein the etching forms a diffractive optical element associated with a particular phase delay for the particular wavelength between the first anti-reflectance structure and the second anti-reflectance structure, and
wherein the second anti-reflectance structure is formed on top of the at least one layer.

19. The method of claim 18, further comprising:
dicing the wafer into a plurality of diffractive optical elements.

20. The method of claim 18, wherein the at least one layer is formed between the first anti-reflectance structure and the second anti-reflectance structure.

21. A method, comprising:
depositing a plurality of thin films onto a wafer using a thin film deposition technique,
the depositing the plurality of thin films including depositing a first anti-reflectance structure for a particular wavelength, and depositing a second anti-reflectance structure for the particular wavelength after depositing the first anti-reflectance structure;
depositing a mask onto a surface of the plurality of thin films;
patterning the mask based on a set of determined transition points that define a plurality of regions of the wafer;
etching a subset of thin films of the plurality of thin films to form a two-level relief profile based on the mask,
wherein the etching forms a diffractive optical element associated with a 7E phase delay for the particular wavelength between the first anti-reflectance structure and the second anti-reflectance structure, and
wherein the first anti-reflectance structure includes two or more layers with a corresponding index of refraction that is different from each other; and removing the mask, and
wherein at least one layer is formed on a fractional portion of the first anti-reflectance structure and between the first anti-reflectance structure and the second anti-reflectance structure, and wherein an index of refraction of the second anti-reflectance structure is different from an index of refraction of the at least one layer.

22. The method of claim 21, further comprising:
dicing the wafer into a plurality of diffractive optical elements.

23. The method of claim 21, further comprising:
forming another diffractive optical element on another side of the wafer with the $\pi$ phase delay for the particular wavelength between a third anti-reflectance structure and a fourth anti-reflectance structure of the other diffractive optical element.

* * * * *